US009252697B2

(12) United States Patent
Ahmad (10) Patent No.: US 9,252,697 B2
(45) Date of Patent: Feb. 2, 2016

(54) MOTOR CONTROLLER

(71) Applicant: Nidec Corporation, Minami-ku, Kyoto (JP)

(72) Inventor: Ghaderi Ahmad, Kyoto (JP)

(73) Assignee: Nidec Corporation, Kyoto (JP)

( * ) Notice: Subject to any disclaimer, the term of this patent is extended or adjusted under 35 U.S.C. 154(b) by 77 days.

(21) Appl. No.: 14/364,303

(22) PCT Filed: Jan. 11, 2013

(86) PCT No.: PCT/JP2013/000070
§ 371 (c)(1),
(2) Date: Jun. 11, 2014

(87) PCT Pub. No.: WO2013/105506
PCT Pub. Date: Jul. 18, 2013

(65) Prior Publication Data
US 2014/0354196 A1 Dec. 4, 2014

Related U.S. Application Data

(60) Provisional application No. 61/585,321, filed on Jan. 11, 2012.

(51) Int. Cl.
*H02K 21/00* (2006.01)
*H02P 25/08* (2006.01)
*H02P 23/00* (2006.01)

(52) U.S. Cl.
CPC ............ *H02P 25/085* (2013.01); *H02P 23/004* (2013.01); *H02P 25/08* (2013.01)

(58) Field of Classification Search
CPC ..... H02P 23/004; H02P 25/05; H02P 25/085; H02P 25/088; H02P 31/00
See application file for complete search history.

(56) References Cited

U.S. PATENT DOCUMENTS

| 5,703,457 | A | | 12/1997 | Davis |
| 5,798,628 | A | * | 8/1998 | Fujita ................... H02P 21/085 318/805 |
| 2009/0026988 | A1 | | 1/2009 | Tomigashi |

FOREIGN PATENT DOCUMENTS

JP 2011-135762 A 7/2011
WO 2011/065406 A1 6/2011

OTHER PUBLICATIONS

Official Communication issued in International Patent Application No. PCT/JP2013/000070, mailed on Apr. 16, 2013.
Grbo et. al., "A Novel Power Inverter for Switched Reluctance Motor Drives," Series: Electrical Engineering, vol. 18, No. 3, Dec. 2005, pp. 453-465, Novi Sad, Serbia.

* cited by examiner

*Primary Examiner* — Karen Masih
(74) *Attorney, Agent, or Firm* — Keating & Bennett, LLP (57) ABSTRACT

A motor controller configured to control an SRM includes an inverter connected to an SRM, a torque and flux estimator configured to estimate a torque and a flux generated in the SRM as an estimated torque and an estimated flux, based on output from the inverter and a rotor angle of the switched reluctance motor, a switching pattern selector configured to select one of a plurality of switching patterns based on comparing a result of a reference torque and the estimated torque, comparing a result of a reference flux and the estimated flux, and a flux phase angle, and performing switching of the inverter in accordance with a selected switching pattern, and a reference flux calculator configured to obtain the reference flux from a flux trajectory and the rotor angle changing the flux trajectory, the flux trajectory indicating a relationship between the rotor angle and the reference flux.

5 Claims, 14 Drawing Sheets

MOTOR CONTROLLER

BACKGROUND OF THE INVENTION

1. Field of the Invention

The present invention relates to a motor controller and more specifically to a motor controller configured to control a switched reluctance motor.

2. Description of the Related Art

Switched reluctance motors have been mentioned recently because of their advantage of low manufacturing costs and simple, rugged structure. A switched reluctance motor (hereinafter, referred to as "SRM") does not have a rotor winding or a permanent-magnet, and has excellent robustness at high speeds and a wide speed range. In an SRM, torque is generated by applying current to stator windings while inductance is changing. If current is applied when the inductance is increasing, positive torque is created, and if current is applied when inductance is decreasing, negative torque is created.

To control the SRM efficiently, individual algorithms are usually used in high, middle, and low speeds. For example, in a low speed, a chopping mode control is used, where a discrete constant current is applied to each phase. In a high speed, another control which is called angle control is used. The switching pattern of this control is called "single-pulse mode" where a single pulse is applied to each cycle of inductance. In a middle speed, a mixed control of low and high speeds is used.

To achieve the required current pattern for an SRM, various special inverters are proposed. For example, Zeljko et al. (A Novel Power Inverter for Switched Reluctance Motor Drives, Elec. Energ. Vol. 18, No. 3, December 2005, pp. 453-465) discloses a topology where four inverter legs are provided for a three-phase SRM supply. The fourth leg is utilized to connect a star point of a three-phase winding. Because of this topology, each phase can be controlled independently.

On the other hand, WO2011/65406 discloses a direct torque control (hereinafter, referred to as "DTC") system for an interior permanent magnet motor. In the DTC system, one of a plurality of switching patterns for the inverter is selected in accordance with a torque, a reference torque, a flux, a reference flux, a phase angle, and so on. The reference flux is obtained by referring to a flux trajectory which shows a relationship between a flux magnitude and a phase angle. The DTC system shown in WO2011/65406 varies the form of the flux trajectory between a circle and a polygon in accordance with a torque, a reference torque, a motor speed and a crossover speed.

Conventional inverters for an SRM have special topologies, therefore, the inverters should have discrete components. Using discrete components in an inverter instead of a single module increases cost, weight, size, assembling time, and complexity, and reduces reliability and ruggedness of the inverter. Further, because these inverters must have special topologies, they cannot be used for any other type of motors.

Furthermore, inverters for an SRM need individual algorithms for high, middle, and low speeds, which increase the complexity of the system and setting time.

SUMMARY OF THE INVENTION

According to an exemplary preferred embodiment of the present invention, a motor controller that controls a switched reluctance motor includes an inverter configured to be connected to a switched reluctance motor; a torque and flux estimator configured to estimate a torque and a flux generated in the switched reluctance motor as an estimated torque and an estimated flux, based on an output from the inverter and a rotor angle of the switched reluctance motor; a switching pattern selector configured to select one of a plurality of switching patterns based on comparing a result of a reference torque and the estimated torque, comparing a result of a reference flux and the estimated flux and a flux phase angle, and performing switching of the inverter in accordance with a selected switching pattern; and a reference flux calculator configured to obtain the reference flux from a flux trajectory and the rotor angle with changing the flux trajectory in accordance with the reference torque and a rotating speed of the switched reluctance motor, the flux trajectory indicating a relationship between the rotor angle and the reference flux.

Preferred embodiments of the present invention simplify controlling of a switched reluctance motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
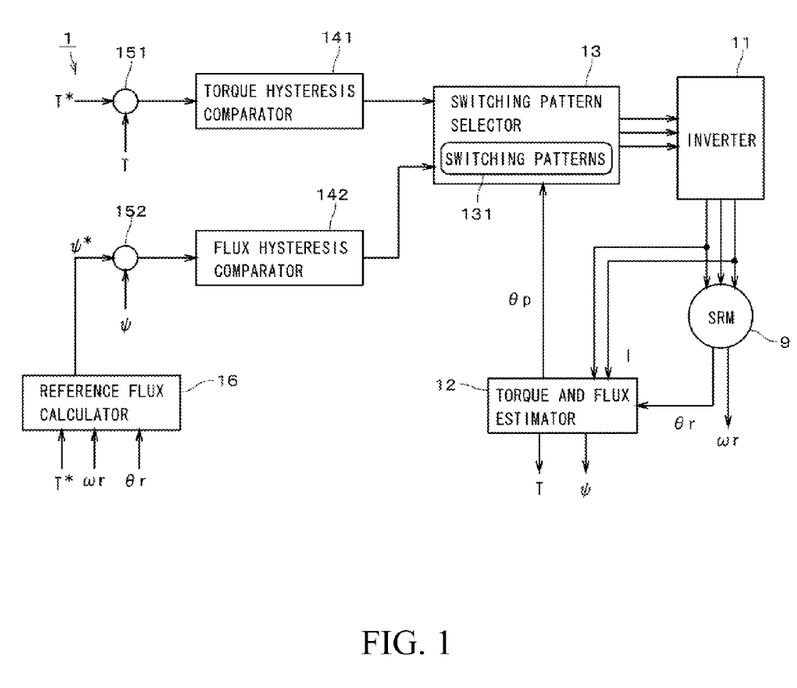
FIG. 1 is a block diagram showing constitution of a motor controller according to a preferred embodiment of the present invention.

FIG. 1 is a block diagram showing components of a motor controller 1 according to a preferred embodiment of the present invention. The motor controller 1 is configured to control an SRM (Switched Reluctance Motor) 9 under DTC (Direct Torque Control).

Figure 2:
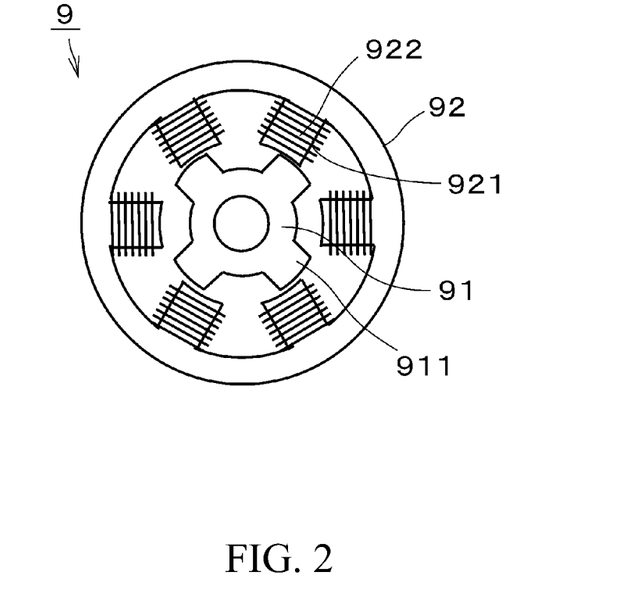
FIG. 2 is a schematic view of an SRM according to a preferred embodiment of the present invention.

FIG. 2 is a schematic view of the SRM 9. The SRM 9 includes a rotor 91 and a stator 92. The rotor 91 is rotatably supported around the rotating axis by a bearing mechanism (not shown). The rotor 91 preferably includes a plurality of portions 911 protruding toward the stator 92, and the stator 92 preferably includes a plurality of portions 921 protruding toward the rotor 91, in other words, the SRM 9 preferably has double saliency. The core of the stator 92 is preferably defined by a steel lamination. A wire is preferably wound around each protruding potion 921 of the stator 92 to define a coil 922. The rotor 91 is preferably defined by a steel lamination and does not include either of a coil or a permanent magnet. Torque is produced by switching current supply pattern while inductance of each phase winding, i.e., coil(s) 922, is changing.

As shown in FIG. 1, the motor controller 1 preferably includes an inverter 11, a torque and flux estimator 12, a switching pattern selector 13, a torque hysteresis comparator 141, a flux hysteresis comparator 142, a torque subtractor 151, a flux subtractor 152, and a reference flux calculator 16. The torque and flux estimator 12 is configured to estimate an estimated torque T and an estimated flux $\psi$.

The switching pattern selector 13 is configured to select a switching pattern out of a plurality of switching patterns which are prepared in advance, and performs switching of the inverter 11 in accordance with the selected switching pattern. The torque subtractor 151 is configured to obtain a difference between the estimated torque T and a reference torque T* and input the difference to the torque hysteresis comparator 141. The torque hysteresis comparator 141 is configured to input the difference to the switching pattern selector 13 with introducing hysteresis to the difference. The flux subtractor 152 is configured to obtain a difference between the estimated flux $\psi$ and a reference flux $\psi$* and input the difference to the flux hysteresis comparator 151. The flux hysteresis comparator 151 is configured to input the difference to the switching pattern selector 13 with introducing hysteresis to the difference. The function of the reference flux calculator 16 will be discussed later.

Figure 3:
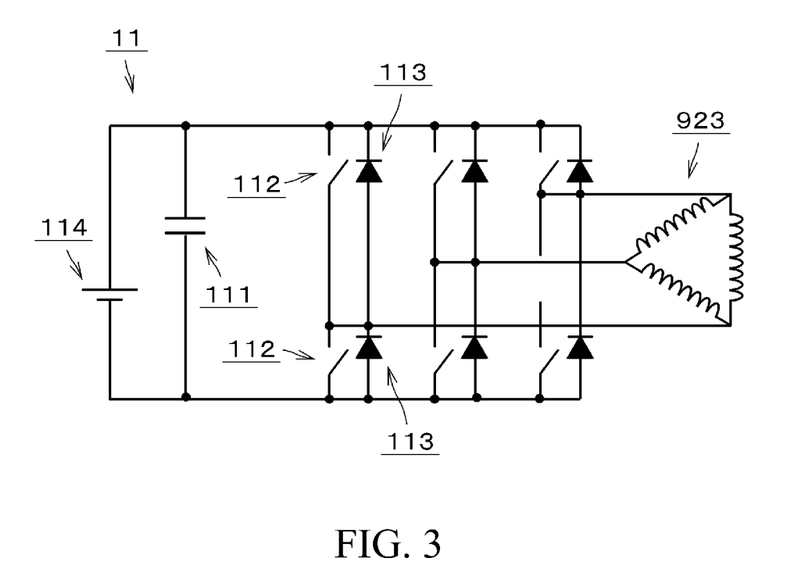
FIG. 3 shows a constitution of an inverter according to a preferred embodiment of the present invention.

FIG. 3 shows a configuration of the inverter 11 connected to the SRM 9. The inverter 11 is preferably a general-purpose VSI (Voltage Source Inverter) which is a three-phase bridge inverter including 6 switching elements, for example. The inverter 11 preferably includes a capacitor 111, three pairs of switching elements 112, and three pairs of diodes 113, for example. These components are connected in parallel to a DC supply 114. Each of three current supply lines is drawn from a point between elements of each pair of switching elements and is connected to the SRM 9. The winding 923 of the SRM 9 is preferably delta-connected. Current supplied from the inverter 11 is bipolar.

As shown in FIG. 1, a rotor angle θr and current I which is an output from the inverter 11 are inputted to the torque and flux estimator 12. The torque and flux estimator 12 estimates a torque produced by the SRM 9 and a flux generated in the SRM 9 as an estimated torque T and an estimated flux $\psi$. The estimated torque T is inputted to the torque subtractor 151. The estimated flux $\psi$ is inputted to the flux subtractor 152.

The reference torque T* is also inputted to the torque subtractor 151. The torque subtractor 151 is configured to obtain a (signed) difference between the estimated torque T and the reference torque T* to input the difference to the torque hysteresis comparator 141. The reference torque T*, for example, is calculated by a calculator (not shown) as a torque which makes a rotating speed of the rotor 91 reach a target speed. The reference flux $\psi$* is also inputted to the flux subtractor 152. The flux subtractor 152 is configured to obtain a (signed) difference between the estimated flux $\psi$ and the reference flux $\psi$* to input the difference to the flux hysteresis comparator 142. The reference flux $\psi$* is calculated by the reference flux calculator 16 which will be discussed later.

The torque hysteresis comparator 141 is preferably a three-valued comparator. The torque hysteresis comparator 141 is configured to output "1" if the (signed) difference between the reference torque T* and the estimated torque T is larger than a predetermined positive threshold value, and outputs "−1" if the difference is smaller than a predetermined negative threshold value. If the difference is between the positive threshold value and the negative threshold value, the torque hysteresis comparator 141 outputs "0". The flux hysteresis comparator 142 is preferably a binary comparator. The flux hysteresis comparator 142 is configured to output "1" if the (signed) difference between the reference flux $\psi$* and the estimated flux $\psi$ is larger than a predetermined positive threshold value, and outputs "−1" if the difference is smaller than a predetermined negative threshold value. If the difference is between the positive threshold value and the negative threshold value, the flux hysteresis comparator 142 maintains outputting "1" or "−1" which is a former condition.

Values outputted from the torque hysteresis comparator 141 and the flux hysteresis comparator 142, in other words, a comparing result of the reference torque T* and the estimated torque T and a comparing result of the reference flux $\psi$* and the estimated flux $\psi$ are inputted to the switching pattern selector 13. On the other hand, the torque and flux estimator 12 estimates a flux phase angle θp and inputs the flux phase angle θp to the switching pattern selector 13. The switching pattern selector 13 selects a switching pattern out of a plurality of switching patterns 131 based on these inputted values, and performs switching of the inverter 11 in accordance with the selected switching pattern.

Table 1 shows a table used in selecting a switching pattern. "↑" in the column of torque T indicates the value inputted to the switching pattern selector 13 from the torque hysteresis selector 141 is "1". In other words, it indicates that a flux vector in the SRM 9 is rotated counterclockwise and a counterclockwise torque is increased. "↓" indicates the inputted value is "−1", the flux vector in the SRM 9 is rotated clockwise and the counterclockwise torque is decreased. "→" indicates the inputted value is "0", the torque is maintained. Actually, the torque gradually decreases in accordance with gradual decrease of the flux.

TABLE 1

| T | $\psi$ | n |
|---|---|---|
| ↑ | ↓ | K + 2 |
| ↑ | ↑ | K + 1 |
| → | — | 0 |
| ↓ | ↑ | K − 1 |
| ↓ | ↓ | K − 2 |

The "↑" in the column of flux $\psi$ indicates the value inputted to the switching pattern selector 13 from the flux hysteresis selector 142 is "1". In other words, it indicates that a flux generated in the SRM 9 needs to be increased. The "↓" indicates the inputted value is "−1" and the flux needs to be decreased. The "−" indicates ignoring the value inputted to the switching pattern selector 13 from the flux hysteresis comparator 142.

Figure 4:
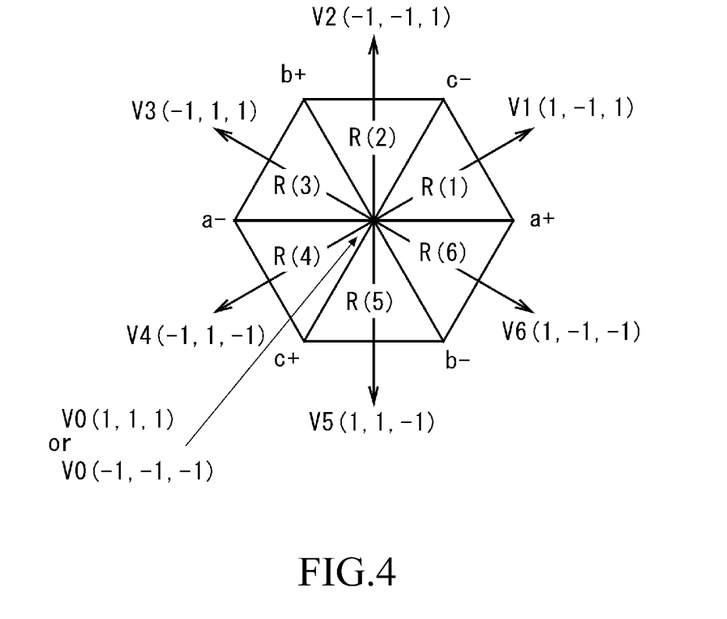
FIG. 4 shows a relationship between flux phase angle, K, and voltage vectors according to a preferred embodiment of the present invention.

The variable "n" shown in the table 1 is the number of switching pattern to be set to the inverter 11. The n is determined by substituting a value indicating a range of the flux phase angle θp for K. FIG. 4 shows a relationship between flux phase angle θp, K, and voltage vectors. A range R(1) shows a range of flux phase angle θp where 1 is substituted for K. Similarly, R(2), R(3), . . . , R(6) show ranges where 2, 3, . . . , 6 are substituted for K, respectively. When (K+2) or (K+1) is more than 6, the value subtracted 6 from (K+2) or (K+1) is set to n. When (K−1) or (K−2) is less than 1, the value added 6 to (K+2) or (K+1) is set to n.

Figure 5:
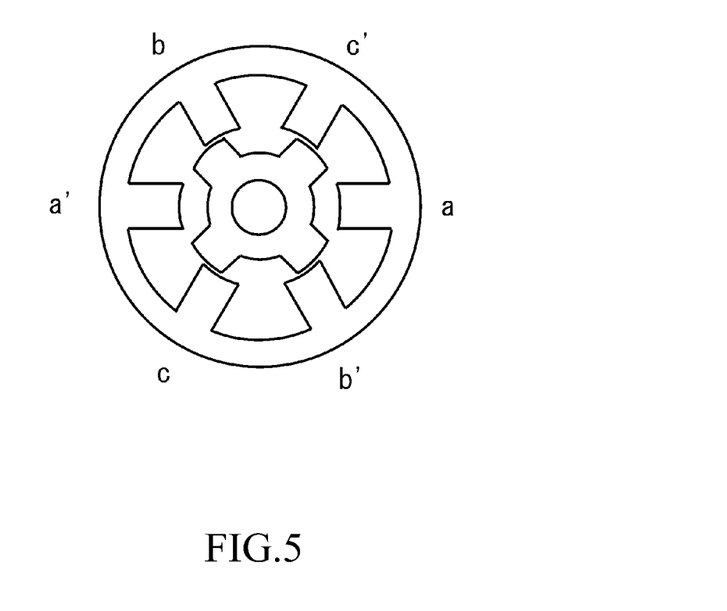
FIG. 5 shows locations of coils according to a preferred embodiment of the present invention.
Figure 6:
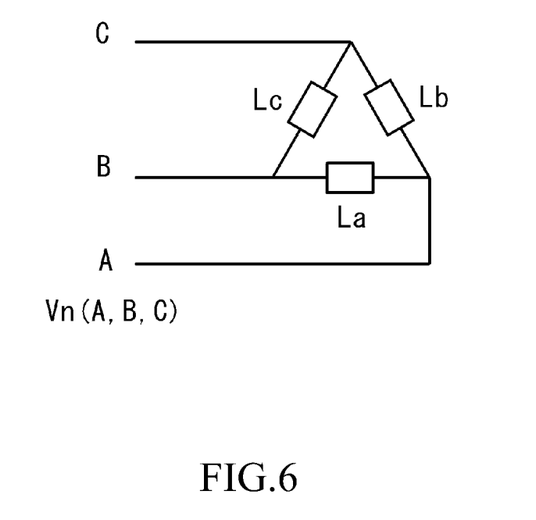
FIG. 6 shows a connection of coils according to a preferred embodiment of the present invention.

FIG. 5 shows a location of coils 922 of each phase corresponding to flux directions a, b, c shown in FIG. 4. FIG. 6 is a schematic diagram showing connection of coils 922. Blocks with La, Lb, Lc represent coils of each phase, and FIG. 6 shows connecting relationship between coil groups La, Lb, Lc and wires A, B, C drawn from the inverter 11. A direction from a' to a in FIG. 5 corresponds to a direction from (a−) to (a+) in FIG. 4. A direction from b' to b corresponds to a direction from (b−) to (b+) in FIG. 4 and a direction from c' to c corresponds to a direction from (c−) to (c+) in FIG. 4. When current runs, in FIG. 6, in a clockwise direction in coil groups La, Lb, Lc which are delta connected, flux is generated in directions (a+), (b+), (c+) in FIG. 4, respectively.

After determining n by the switching pattern selector 13 based on the values inputted from the torque hysteresis comparator 141 and the flux hysteresis comparator 142, the flux phase angle θp, and table 1, a switching pattern for the inverter 11 is selected to realize a voltage vector Vn(A, B, C). Vn(A, B, C) is one of voltage vectors V1(1, −1, 1), V2(−1, −1, 1), ..., V6(1, −1, −1) shown in FIG. 4, "1" or "−1" is set to each of A, B, C in accordance with the value n. "1" indicates applying a positive voltage to the wire A, B or C, and "−1" indicates applying a negative voltage to the wire A, B or C.

For example, if a value inputted from the torque hysteresis comparator 141 is "1", a value inputted from the flux hysteresis comparator 142 is "−1", and the flux phase angle θp exists in the range R(1), then, "1" is substituted for K and n is set to (K+2), i.e., 3, with reference to the uppermost line of table 1. Consequently, to make a voltage vector V3(−1, 1, 1) shown in FIG. 4, a switching pattern is set to the inverter 11 to apply voltages which are negative, positive, positive, respectively, to the wires A, B, C shown in FIG. 5. Since the flux vector is represented by integration of voltage vectors, the end point of the flux vector which exists in the range R(1) moves in the direction of V3 of FIG. 4. As a result, torque increases and flux decreases.

For another example, if a value inputted from the torque hysteresis comparator 141 is "−1", a value inputted from the flux hysteresis comparator 142 is "1", and the flux phase angle θp exists in the range R(3), then, "3" is substituted for K and n is set to (K−1), i.e., 2 with referring to the third line of table 1. Consequently, to make a voltage vector V2(−1, −1, 1) in FIG. 4, a switching pattern is set to the inverter 11 to apply voltages which are negative, negative, positive, respectively, to the wires A, B, C shown in FIG. 5. The end point of the flux vector which exits in the range R(3) moves in the direction of V2 of FIG. 4, and torque decreases and flux increases.

When a value inputted from the torque hysteresis comparator 141 is "0", 0 is set to n and V0(1,1,1) or V0(−1, −1, −1) is selected. As a result, a switching pattern is selected to apply a positive voltage or a negative voltage to all of the wires A, B, C.

As discussed above, torque and flux are controlled by selecting switching patterns of the inverter 11 through the switching pattern selector 13, the SRM 9 is controlled to make the estimated torque T and the estimated flux ψ follow the reference torque T* and the reference flux ψ.

Figure 7:
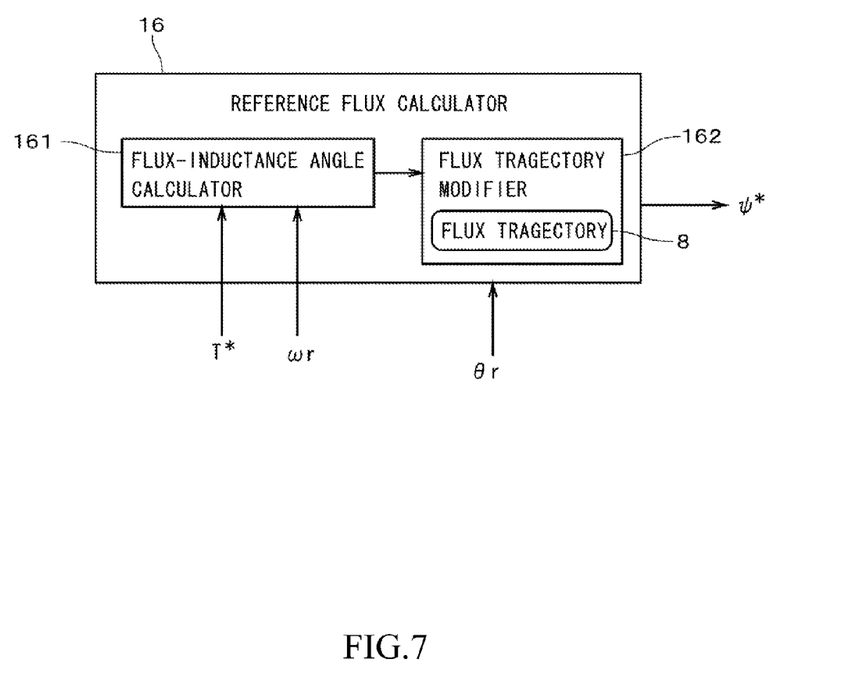
FIG. 7 shows a constitution of a reference flux calculator according to a preferred embodiment of the present invention.

FIG. 7 shows components of the reference flux calculator 16. The reference flux calculator 16 preferably includes a flux-inductance angle calculator 161 and a flux trajectory modifier 162. A reference torque T* and a rotating speed ωr are inputted to the flux-inductance angle calculator 161. The rotating speed ωr is detected by a sensor provided in the SRM 9. The rotating speed ωr may be calculated from the rotor angle θr. In other words, a sensor obtaining the rotor angle θr and a sensor obtaining the rotating speed ωr may be provided with the SRM 9, and the sensor obtaining the rotating speed ωr can be omitted if so desired.

The flux-inductance angle calculator 161 is configured to calculate a flux-inductance angle based on the reference torque T* and the rotating speed ωr. The flux trajectory modifier 162 is configured to modify the flux trajectory 8 in accordance with the flux-inductance angle. The reference flux calculator 16 is configured to calculate a reference flux ψ* based on the rotor angle θr and the flux trajectory 8.

Figure 8:
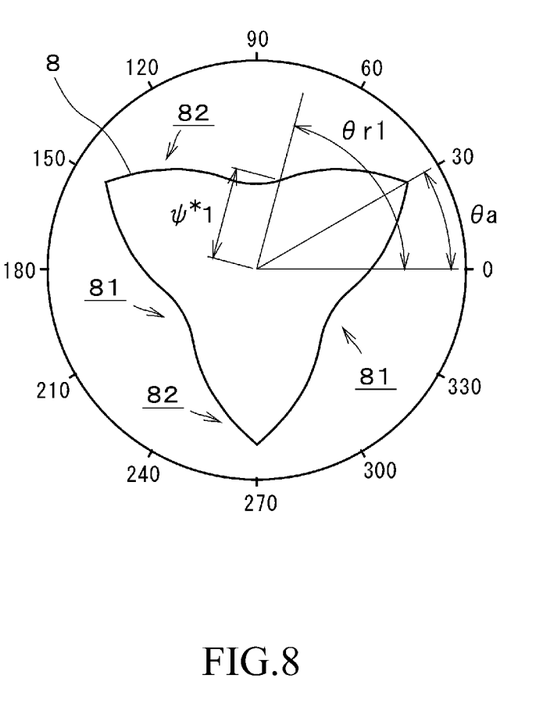
FIG. 8 shows a flux trajectory according to a preferred embodiment of the present invention.

FIG. 8 shows an example of a flux trajectory 8. The flux trajectory 8 is depicted in a polar coordinates system in FIG. 8, and the radial direction corresponds to magnitude of flux and circumferential direction corresponds to the rotor angle θr. The shape of the flux trajectory 8 is preferably a nearly equilateral triangle. For example, when the rotor angle is θr1 shown in FIG. 8, the reference flux ψ*1 is calculated, where the magnitude of the reference flux is the distance between the center and the flux trajectory 8. Since the reference flux ψ* corresponding to the rotor angle θr is calculated and control is performed to bring the estimated flux ψ close to the reference flux ψ*, the end position of a flux vector which starts form the origin traces the flux trajectory 8.

Figure 9:
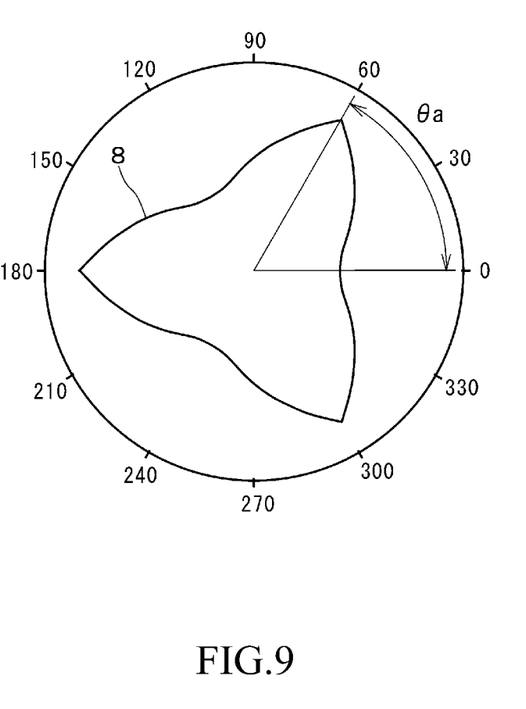
FIG. 9 shows a flux trajectory according to a preferred embodiment of the present invention.
Figure 10:
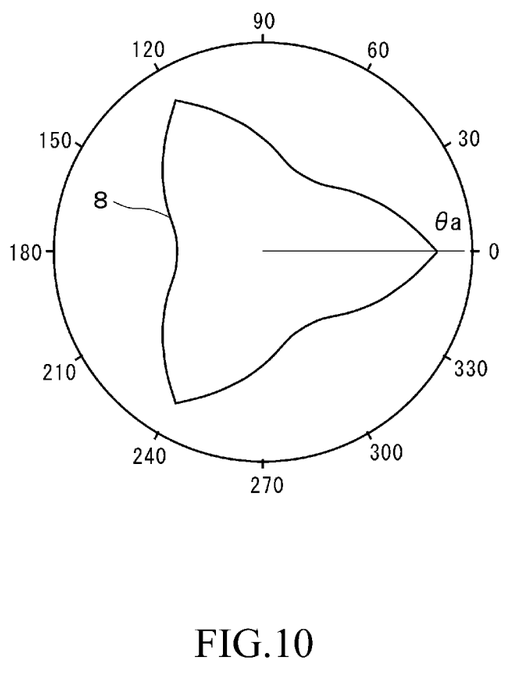
FIG. 10 shows a flux trajectory according to a preferred embodiment of the present invention.

FIG. 8 shows a flux trajectory 8 in a case where the flux-inductance angle θa is 30 degrees. FIG. 9 shows a flux trajectory 8 where the flux-inductance angle θa is 60 degrees, and FIG. 10 shows a flux trajectory 8 where the flux-inductance angle θa is 0 degree. The flux-inductance angle θa is an angle between similar points of amplitudes of flux and inductance in one phase. For example, it can be defined as an angle between two angles (or directions) in which the maximum flux and the maximum inductance occur, respectively. Physically, the value of flux-inductance angle indicates the phase relationship between flux and inductance.

As shown FIGS. 8 to 10, the flux-inductance angle θa is changed based on the reference torque T* and the rotating speed ωr. The flux trajectory 8 is rotated in accordance with a change of the flux-inductance angle θa. In other words, the flux trajectory 8 is shifted with respect to the rotor angle θr when the flux-inductance angle θa is changed.

The maximum available flux is limited by back EMF (electro-motive force) inducted in the SRM 9. It means that, because the flux amplitude cannot be increased at high speeds, the available average torque should be set by changing the flux-inductance angle θa. Therefore, the flux-inductance angle calculator 161 is configured to monitor the rotating speed ωr, and then based on the reference torque T*, to calculate the flux-inductance angle θa. In more detail, the flux-inductance angle calculator 161 is configured to calculate the flux-inductance angle θa based on the rotating speed ωr, and the reference torque T*, to modify motor efficiency.

In a conventional DTC, the reference flux is obtained from the flux trajectory with referring to a flux phase angle. However, since an SRM has double saliency and rotation is realized by using change of inductance, the reference flux cannot be obtained by referring to the flux phase angle. Therefore, the motor controller executes a calculation of the reference flux ψ* by referring to the rotor angle θr. In addition, since the conventional DTC controls a motor which does not have double saliency, the magnitude of the reference flux does not change greatly. Consequently, the shape of the conventional flux trajectory is circular or nearly polygonal. An SRM has double saliency, therefore, the reference flux should be changed largely in accordance with the inductance. For the above reason, a flux trajectory 8 including a plurality of concave 81 portions, which is achievable using preferred embodiments of the present invention, is preferable. In the trajectory 8 according to a preferred embodiment of the present invention, convex portions 82 and concave portions 82 are arranged alternately in the circumferential direction.

The motor controller 1 controls the SRM 9 under DTC. All DC link voltage is available to perform magnetization and demagnetization of phases, therefore, the motor can work in an entire speed range. As a result, conventional individual control algorithms are not needed at high, middle and low speeds, and this makes the motor control according to a preferred embodiment of the present invention simple. Because a single algorithm is preferably used for all speed areas in accordance with a preferred embodiment of the present invention, it does not need complex setting. Dynamic response is much higher than previous SRM control by using DTC, therefore, the motor controller 1 according to preferred embodiments of the present invention is especially suitable for vehicular applications.

Moreover, a general-purpose inverter, which is, for example, "three-phase VSI 6-pack", for other types of motors (IM, IPM, SPM etc.) can be utilized for the inverter 11. This makes it possible to reduce manufacturing cost, weight, size, assembling time, and complexity of the motor controller 1, and to increase inverter reliability, and ruggedness.

Figure 11:
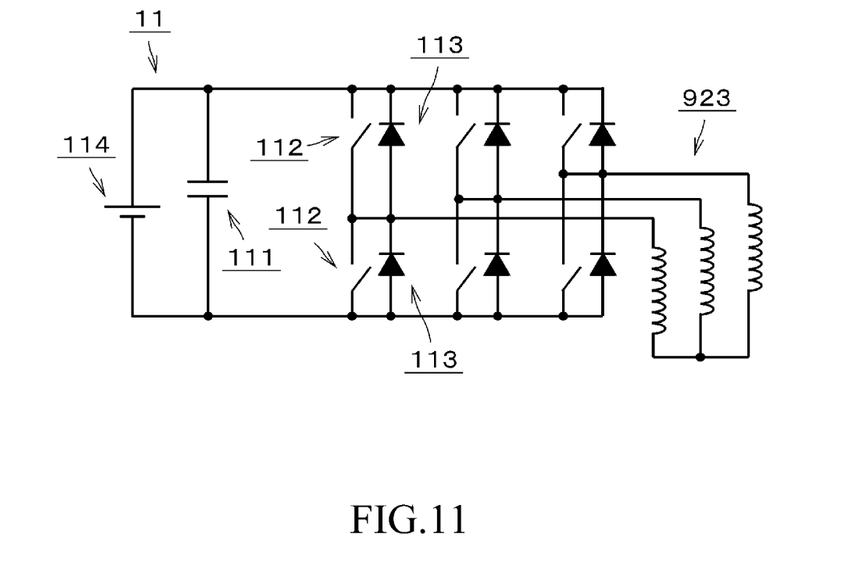
FIG. 11 shows a connection between the inverter and the winding according to a preferred embodiment of the present invention.

The DTC described above can be applied to an SRM having star-connected winding. The structure of the motor controller 1 in this case is preferably the same as the structure shown in FIG. 1. FIG. 11 shows a connection between the inverter 11 and the winding 923 and corresponds to FIG. 3. The structure of the inverter 11 is preferably also the same as the structure of a general-purpose inverter when a star-connected motor is controlled.

Figure 12:
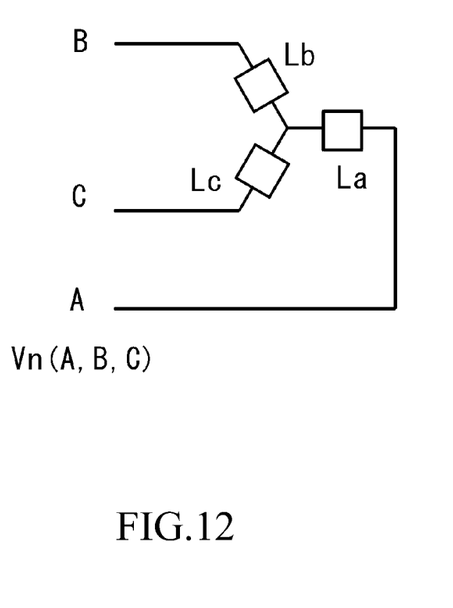
FIG. 12 shows a connection of coils according to a preferred embodiment of the present invention.
Figure 13:
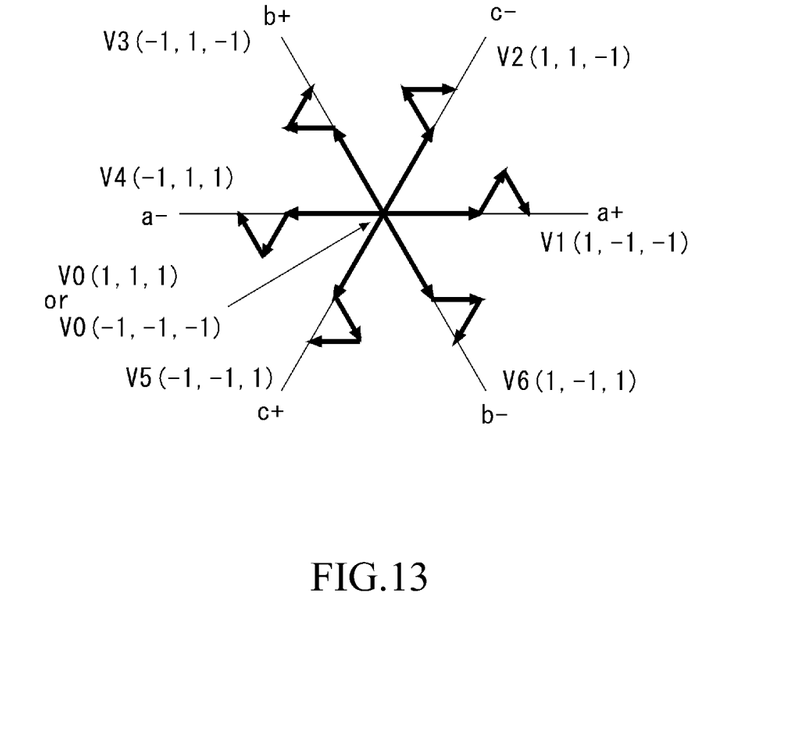
FIG. 13 shows components of voltage vectors according to a preferred embodiment of the present invention.
Figure 14:
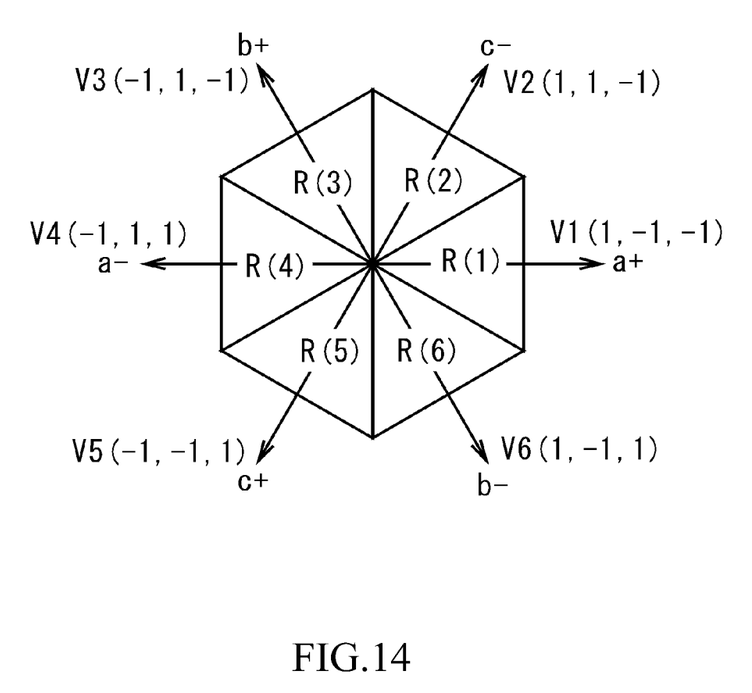
FIG. 14 shows a relationship between flux phase angle, K, and voltage vectors according to a preferred embodiment of the present invention.

FIG. 12 is a schematic diagram showing connections of coils 922 in the same manner as FIG. 6. Blocks with La, Lb, Lc represent coils of each phase, and FIG. 12 shows connecting relationship between coil groups La, Lb, Lc and wires A, B, C drawn from the inverter 11. FIG. 13 shows voltage vectors V1, V2, ..., V6 and V0, and their components, where positive or negative voltage is applied to each of wires A, B and C. In the case of star-connection, as shown in FIG. 13, moving directions of the endpoint of the flux vector in accordance with the voltage vectors are (a+), (c−), (b+), (a−), (c+), (b−), respectively. The relationship between changing of torque T and flux ψ and n is the same as shown in table 1. The relationship between the flux phase angle θp and K for determining n is shown in FIG. 14.

As mentioned above, in the case where the winding 923 is star-connected in the SRM 9, in the same manner as the case of delta-connection except for the relationship between the flux phase angle θp and the switching patterns, the SRM 9 can be controlled under DTC.

Various modifications can be adopted in the preferred embodiments discussed above. Appropriate modifications of details of DTC are allowed. For example, the torque hysteresis comparator 141 can output a binary value. The shape of the flux trajectory 8 is not restricted to the shape disclosed in the above preferred embodiments. The modification of the flux trajectory 8 is not restricted to rotation, but the shape can be changed.

While preferred embodiments of the present invention have been shown and described in detail, the foregoing description is in all aspects illustrative and not restrictive. It is therefore understood that numerous modifications and variations can be devised without departing from the scope of the present invention.

Preferred embodiments of the present invention can be applied to switched reluctance motors for various uses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor controller configured to control a switched reluctance motor, the motor controller comprising:
    an inverter configured to be connected to a switched reluctance motor;
    a torque and flux estimator configured to estimate a torque and a flux generated in the switched reluctance motor as an estimated torque and an estimated flux, based on output from the inverter and a rotor angle of the switched reluctance motor;
    a switching pattern selector configured to select one of a plurality of switching patterns based on comparing a result of a reference torque and the estimated torque, comparing a result of a reference flux and the estimated flux, and a flux phase angle, and to perform switching of the inverter in accordance with a selected switching pattern; and
    a reference flux calculator configured to obtain the reference flux from a flux trajectory and the rotor angle changing the flux trajectory in accordance with the reference torque and a rotating speed of the switched reluctance motor, the flux trajectory indicating a relationship between the rotor angle and the reference flux.

2. The motor controller according to claim 1, wherein the inverter is a three-phase bridge inverter including six switching elements.

3. The motor controller according to claim 1, wherein the flux trajectory is shifted with respect to the rotor angle by the reference flux calculator in accordance with the reference torque and the rotating speed of the switched reluctance motor.

4. The motor controller according to claim 1, wherein the flux trajectory depicted in a polar coordinates system includes a plurality of concave portions.

5. The motor controller according to claim 1, wherein a winding of the switched reluctance motor is delta-connected.

* * * * *